US009408380B2

(12) United States Patent
Donoho

(10) Patent No.: US 9,408,380 B2
(45) Date of Patent: *Aug. 9, 2016

(54) ELECTRIC DETERRENT DEVICE

(71) Applicant: Bird-B-Gone, Inc., Mission Viejo, CA (US)

(72) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,608

(22) Filed: Aug. 11, 2015

(65) Prior Publication Data

US 2015/0342173 A1 Dec. 3, 2015

Related U.S. Application Data

(60) Continuation of application No. 14/104,456, filed on Dec. 12, 2013, now Pat. No. 9,101,127, which is a division of application No. 13/867,781, filed on Apr. 22, 2013, now Pat. No. 8,733,014, which is a division of application No. 13/492,483, filed on Jun. 8, 2012, now Pat. No. 8,424,238, which is a continuation of application No. 12/689,406, filed on Jan. 19, 2010, now Pat. No. 8,196,340.

(60) Provisional application No. 61/145,715, filed on Jan. 19, 2009.

(51) Int. Cl.
*A01M 19/00* (2006.01)
*A01M 29/24* (2011.01)
*A01M 29/26* (2011.01)
*A01M 29/28* (2011.01)

(52) U.S. Cl.
CPC .............. *A01M 29/24* (2013.01); *A01M 29/26* (2013.01); *A01M 29/28* (2013.01)

(58) Field of Classification Search
USPC ............ 43/98, 112; 340/573.2; 119/713, 712; 256/10; 361/232
See application file for complete search history.

(56) References Cited

U.S. PATENT DOCUMENTS

| 2,989,789 A | 6/1961 | Cohn |
| 3,366,854 A | 1/1968 | Robinson |
| 4,015,176 A | 3/1977 | Shanahan et al. |

(Continued)

FOREIGN PATENT DOCUMENTS

| DE | 3930012 A1 | 3/1991 |
| EP | 1205589 A1 | 5/2000 |

(Continued)

OTHER PUBLICATIONS

Patent Cooperation Treaty, "Notification of Transmittal of the International Search Report and the Written Opinion of the International Search Authority, or the Declaration", PCT/US2010/021395, issued Mar. 30, 2010.

*Primary Examiner* — Christopher P Ellis
(74) *Attorney, Agent, or Firm* — Fish & Tsang LLP

(57) ABSTRACT

Electric pest deterrents device having knitted conductors are presented. An elongated conductor comprising at least a single conducting strand knitted with itself or with other conducting strands can be attached to a base of the device. The conducting strands can be knitted according to one or more patterns to form textured surfaces having raise protrusions.

22 Claims, 4 Drawing Sheets

(56) References Cited

U.S. PATENT DOCUMENTS

| | | |
|---|---|---|
| 4,299,048 A | 11/1981 | Bayes |
| 4,471,561 A | 9/1984 | Lapierre |
| 4,706,941 A | 11/1987 | Sherdan |
| 4,747,229 A | 5/1988 | Chambers |
| 4,839,984 A | 6/1989 | Saunders et al. |
| 4,862,637 A | 9/1989 | Dressel |
| 4,949,216 A | 8/1990 | Djukastein |
| 5,007,196 A | 4/1991 | Saunders et al. |
| 5,019,438 A | 5/1991 | Rapisarda |
| 5,031,353 A | 7/1991 | Gardiner |
| 5,036,166 A | 7/1991 | Monopoli |
| 5,096,162 A | 3/1992 | Cleveland |
| 5,151,319 A | 9/1992 | Schoutteten |
| 5,357,049 A | 10/1994 | Plummer, III |
| 5,366,780 A | 11/1994 | Rapisarda |
| 5,430,255 A | 7/1995 | Downie et al. |
| 5,570,537 A | 11/1996 | Black et al. |
| 5,850,808 A | 12/1998 | Burdick |
| 5,957,434 A | 9/1999 | Nilsson |
| 6,314,914 B1 | 11/2001 | Betzen |
| 6,332,262 B1 | 12/2001 | Sakamoto |
| 6,341,550 B1 | 1/2002 | White |
| 6,457,283 B1 | 10/2002 | Jensen |
| 7,249,436 B2 | 7/2007 | Ravenelle et al. |
| 7,434,788 B2 | 10/2008 | Foster |
| 7,481,021 B2 | 1/2009 | Riddell |
| 8,015,747 B2 | 9/2011 | Donoho |
| 8,196,341 B2 | 6/2012 | Donoho |
| 8,407,932 B2 | 4/2013 | Donoho |
| 8,424,238 B2 | 4/2013 | Donoho |
| 8,640,380 B2 | 2/2014 | Turner |
| 8,733,014 B2 | 5/2014 | Donoho |
| 2002/0066895 A1 | 6/2002 | Wildschut |
| 2005/0132635 A1 | 6/2005 | Riddell |
| 2006/0032111 A1 | 2/2006 | Willard et al. |
| 2006/0144614 A1 | 7/2006 | Kircanski et al. |
| 2007/0214710 A1 | 9/2007 | Donoho |

FOREIGN PATENT DOCUMENTS

| | | |
|---|---|---|
| EP | 1314355 B1 | 11/2002 |
| JP | 2002000163 A | 1/2002 |
| JP | 2003219788 | 1/2002 |
| WO | 84/04022 | 4/1983 |
| WO | 93/20689 | 10/1993 |
| WO | 95/08915 | 4/1995 |
| WO | 00/21363 | 4/2000 |

ELECTRIC DETERRENT DEVICE

This application is a continuation of U.S. Patent Application No., filed Dec. 12, 2013, which is a divisional of U.S. patent application Ser. No. 13/867,781, filed Apr. 22, 2013, now issued U.S. Pat. No. 8,733,014, which is a divisional of U.S. patent application Ser. No. 13/492,483, filed Jun. 8, 2012, now issued U.S. Pat. No. 8,424,238, which is a continuation of U.S. patent application Ser. No. 12/689,406, filed Jan. 19, 2010, now issued U.S. Pat. No. 8,196,340, which claims the benefit of priority to U.S. Provisional Application No. 61/145,715, filed on Jan. 19, 2009. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is deterrent device technologies.

BACKGROUND

Previous efforts directed toward producing electric deterrent devices focus on disposing parallel conductors on an elongated non-conducting material. The conductors can be coupled to an electrical power supply to charge the conductors. When an undesirable pest comes into contact with the conductors, the pest forms a short circuit between the conductors and thereby receives an electrical shock. An ideal deterrent device would include one or more conductors that have high flexibility and have a textured surface area to provide multiple points of contact against a pest.

One example of a deterrent device includes the insect guard described in U.S. Pat. No. 4,839,984 to Saunders et al. titled "Insect Guard System and Method of Use". Saunders discloses an insect guard comprising two conducting strips that can be deposited or sewn on an elongated insulating material where each conducting strip is a single sheet. However, the conducting strips could break under repeated flexing or corrode easily reducing their efficiency.

Another example of a deterrent device includes those described in international application WO 95/08915 to Greenwood titled "Deterrent Arrangement". Greenwood contemplates that conductors can include wires or a plurality of entwined strands that can be molded into or glued to the device's base material. The use of entwined strands has greater flexibility than conducting strips. However, when strands are molded into or glued to the base material, a substantial portion of their flexibility is lost.

Yet another example of a deterrent device includes the electrical deterrent device disclosed in U.S. patent application publication 2005/0132635 to Riddell titled "Electric Deterrent Device". Riddell discloses that conductors can include braided elements of three or more interwoven strands similar to the entwined strands of Greenwood. Riddell further contemplates that the conducting braided elements can be sewn to the deterrent device's base material as suggested by Saunders. The Riddell deterrent device is thought to have high flexibility. However, the contemplated braided conductors are flat and lack a sufficient texture to provide many points of contact against a pest.

Interestingly, known solutions merely form conductors out of a flat conducting sheet or multiple strands woven or braided. It has yet to be appreciated that the conductors of a deterrent device can comprise single strands knitted with themselves or with each other to form a textured surface. For example, a conductor can comprise a single wire strand that is knitted in a long strip. Such a knitted strip provides desirable flexibility by being able to flex in multiple dimensions and provides a textured surface due to interlocking loops of the knitting stitches. Textured surfaces are considered advantageous because such surface provide many protruding potential electrical contact points or a better surface by which a pest would likely grip the deterrent device.

Therefore, there remains a considerable need for methods, systems, and configurations to provide electrical deterrent devices having flexible and/or textured conductors.

SUMMARY OF THE INVENTION

The inventive subject matter provides apparatus, systems and methods in which an electrical deterrent device can include an elongated base having one or more conductors coupled to the base, possibly via sewing. Preferably the conductor comprises at least one conducting strand knitted with at least itself, or with additional conducting strands, to form an elongated conducting band. The conducting band can be knitted as a flat sheet, a tube, or even multiple tubes nested within each other. In some embodiments, the knitted conducting band can be knitted according to a desired pattern in a manner where the conducting band has a varied texture. It is also contemplated that the conducting band can include a non-braided or non-warp and weft mesh, woven strand.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
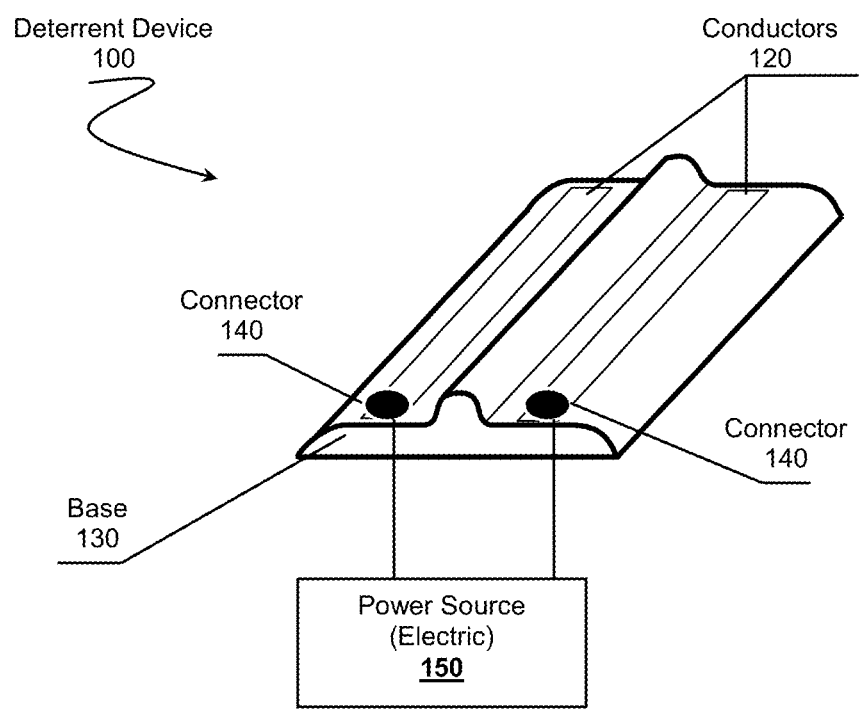
FIG. 1 is a possible a deterrent device.

In FIG. 1, a deterrent device 100 comprises elongated base 130, to which is attached at least one of flexible conductor 120. Preferably, device 100 includes at least two parallel conductors 120 disposed on either side of an insulator ridge. Conductors 140 couple to electrical power source 150 via electrical connectors 140. The spacing between conductors 120 can be adjusted as desired based on a target pest to be deterred (e.g., insects, birds, rodent, arachnids, reptiles, etc.). For example, conductors 120 might be spaced apart by about one centimeter for medium sized birds. For smaller pests, insects for example, the spacing might be on the order of millimeters.

Base 130 can be formed from any suitable insulating material that is preferably flexible. For example, base 130 can comprise extruded PVC. Flexibility of base 130 allows device 100 to be installed around sharp corners or otherwise conform to the geometry or topology of an installation surface (e.g., boats, house trim, etc.).

Conductors 120, preferably elongated conducting bands comprising knitted strands, can be attached to base 130 using various suitable techniques. In a preferred embodiment, conductors 120 can be sewn to base 130, which retains flexibility of over all devices 100. Other techniques for attaching conductors 120 to base 130 can also include mechanical fasteners (e.g., staples, bolts, clamps, friction fit within grooves, rivets, etc.), chemical fasteners (e.g., glues, adhesives, etc.), or thermal fasteners (e.g., melting, molding base 130 around portions of conductors 120, spot welds or moldings, etc.).

A product that embodies at least some of the disclosed inventive subject matter can be obtained from Bird-B-Gone™, Inc. of Mission Viejo, Calif. Bird-B-Gone's product Bird Jolt FlatTrack™ was released in February 2009, and includes knitted conductors attached to flexible, elongated base.

Figure 2:
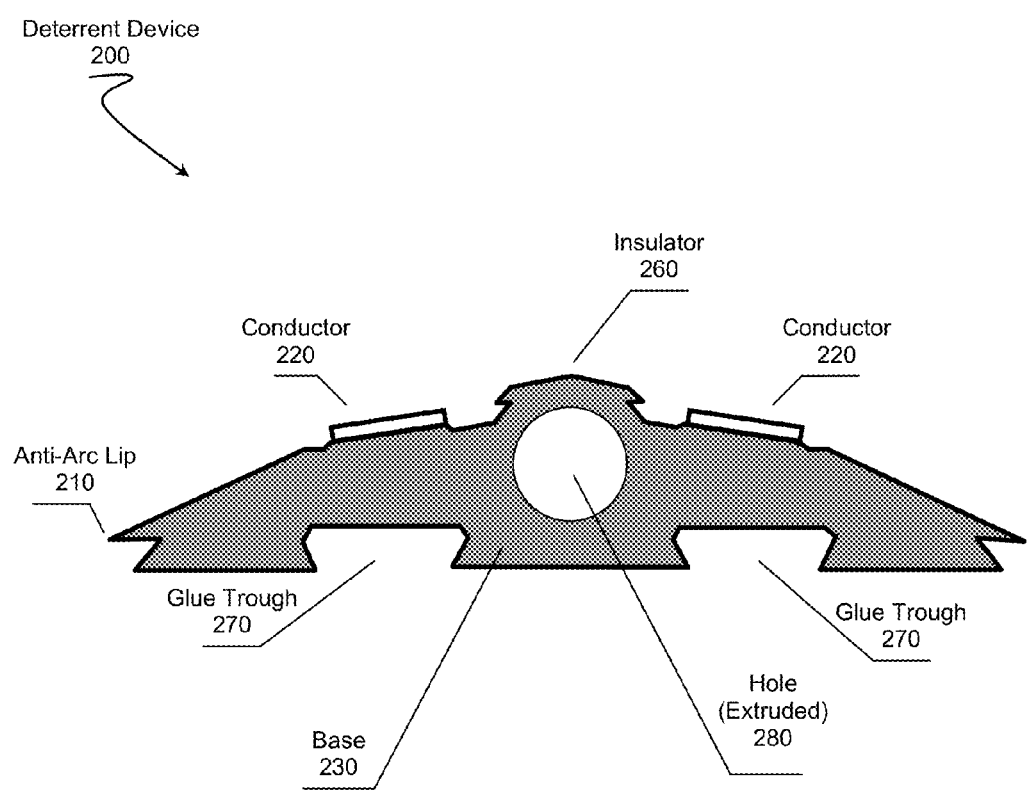
FIG. 2 is an example embodiment of a deterrent device.

FIG. 2 provides a cross section view of a preferred deterrent device 200 as embodied by the Bird Jolt FlatTrack. Device 200 can be sized and dimensioned to deter birds, sea gulls for example, and can have a width of approximately 1.5 inches and height of approximately 0.25 inches. In the example shown, device 200 can include one or more of glue trough 270, which can be used to chemically adhere device 200 to an installation surface (e.g., wood, stone, brick, concrete, fiberglass, etc.). Troughs 270 can be preferably filled with a non-silicone outdoor construction adhesive to adhere based 230 to the installation surface.

Device 200 can also include two parallel conductors 220 preferably comprising knitted conducting strands forming elongated bands or strips. One acceptable example for conductors 220 includes corrosion resistant copper, ETP 0.005 inch diameter, tin-plated knitted wire mesh stocking (e.g., tube). For use as a bird deterrent, acceptable dimensions of connectors 220 can include a width of about 0.25 inches and thickness of about 0.032 inches. Conductors 220 are preferably sewn to base 230.

Device 200 includes many additional market relevant features. For example, insulator 260 represents a raise portion of base 230 that can aid in preventing arcing from one conductor to another. In a similar vein, device 200 can include anti-arc lip 210 to prevent arcing to an installation surface. Device 200 can also include one or more of hole 280, which provide for greater flexibility when installing around sharp corners. The configuration of device 200 allows for bending device 200 a full 360° on a vertical plane. Note that hole 280 can be extruded as part of base 230 and is placed at the thickest portion of base 230. Such a placement reduces resistance to flexing, reduces resistance to cutting, and saves on material cost in manufacture.

Figure 3:
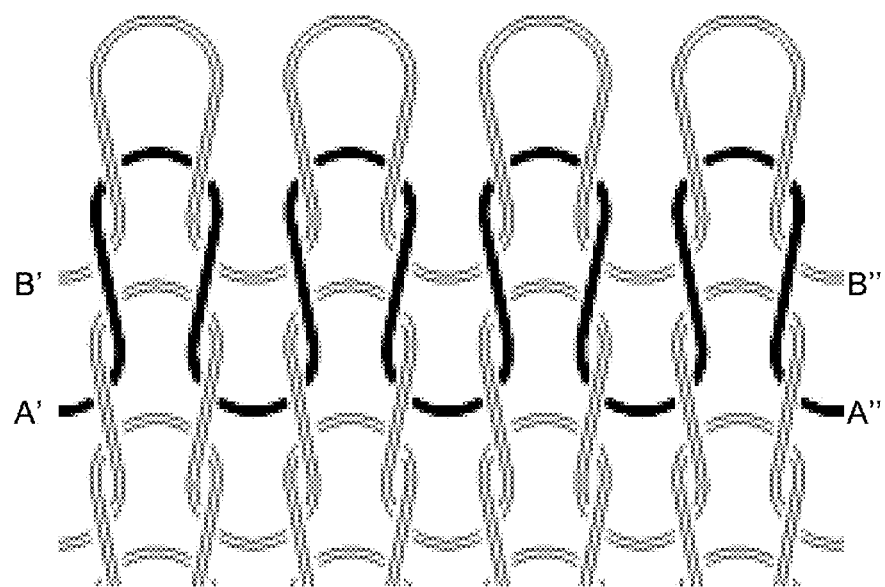
FIG. 3 illustrates an example a basic knit pattern.

As mentioned previously, conductors used on a deterrent device preferably comprise one or more conducting strands knitted together to form an elongated conducting band. FIG. 3 illustrates a basic knitting pattern where strands are knitted to have inter-locking loops as shown. For example, the upper loops of strand A loop around the lower loops of strand B. It should be noted that the example shows a single loop inter-locking with a single set of adjacent loops. It is also contemplated that the loops could inter-lock with more than one layer of loops to form a tighter or stronger knit if desired. The pattern can be used to form a conductor based on a single strand or multiple strands. One should appreciate that example pattern can comprise a single strand knitted with itself to form a sheet or a tube, often referred to as a stocking. In a circular knit used to form a tube end B' could be continuous with end A". In a sheet knit used to form a sheet, end B' could be continuous with end A'. In a multiple strand version, strand A could be a distinct strand from conducting strand B while still being knitted with each other. When knitting multiple strands to form a conducting tube or stocking, the strands can form multiple, intertwined or interlocking helices. Such an approach is advantage to increase the production rate of the conductors or to increase the variation of possibly textured patterns. A single strand can comprise an individual filament or multiple filaments, possibly twined together.

Knitted conductors can take on various configurations. In some embodiments, a conductor includes multiple layers of knitted conducting bands that are placed one on top of another. For example, the conductor can comprise multiple flat knitted sheets, ribbons, or strips that are stacked to form a layered conductor. Another example of a layered conductor includes multiple knitted tubes that are flattened and stacked to form the layered conductor.

In a preferred embodiment, a layered conductor comprises multiple knitted tubes where one knitted tube is nested within another knitted tube. Two, three, four, or more knitted tubes can be nested. It is thought that a conductor comprising multiple nested knitted wire tubes provides for greater conductivity, robustness, or flexibility. It is also contemplated that a layered conductor could comprise combinations of sheets, tubes, or other configurations based on knitting or even other types of conductors.

Figure 4:
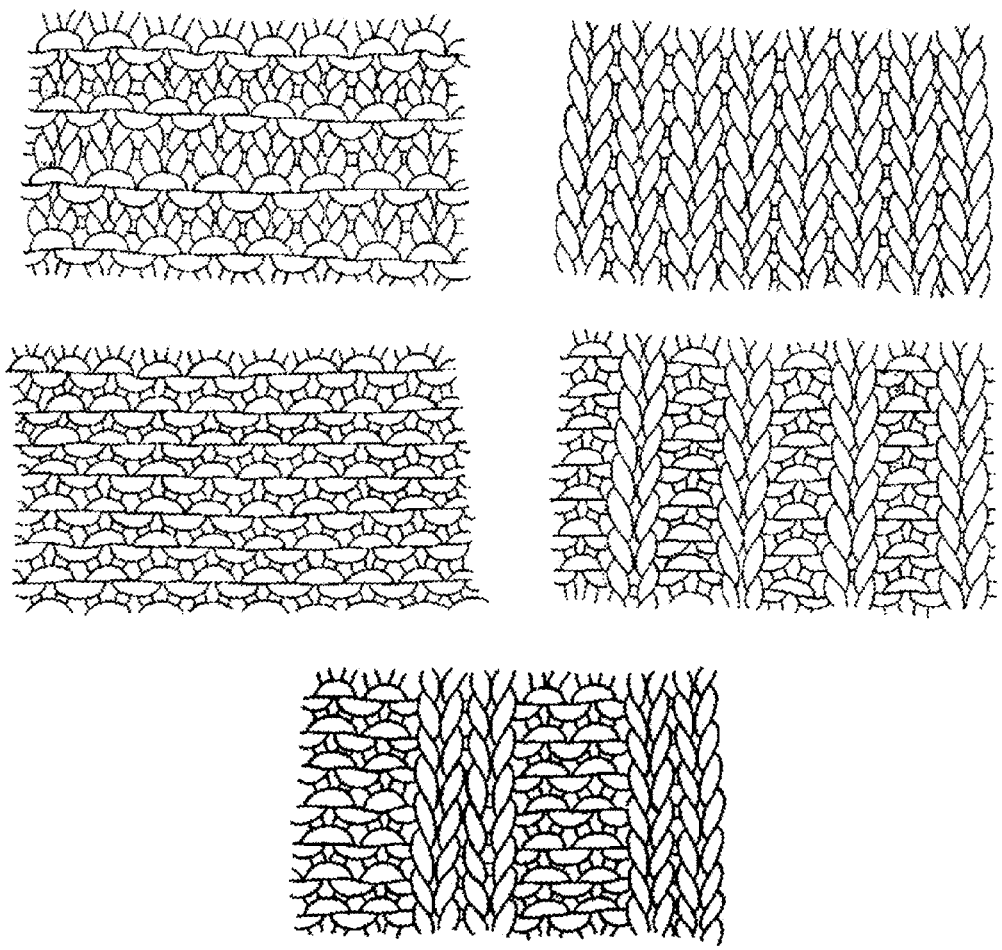
FIG. 4 illustrates possible knitting textured patterns for a conductor.

Although FIG. 3 presents a basic pattern, one should also appreciate that knitting a conducting strand with at least itself can produce a myriad of other patterns. For example, in FIG. 4, five additional patterns are presented where each pattern can be achieved via knitting a single conducting strand with itself or knitting the strand with other conducting strands and itself. Utilizing different patterns should not be considered a mere design choice as the textures formed from the different patterns can confer specific capabilities to a conductor or the device. Tight patterns lacking significant gaps or exposed bumps would likely be suited for dry environments or for smaller pest. Loose patterns having gaps between strands would likely be suited for wet environments to allow moisture to easily evaporate. Patterns having raise protrusions can provide additional contacting surfaces for a pest that would not available in flatten woven or braided traditional deterrent conductors.

Many different types of knitting patterns can be employed. Example knitting patterns that can yield textured conductors include entrelac knitting, ribbing, cable knitting, garter stitching, seed stitching, faggoting, tricot knitting, or other knitting patterns.

Example suitable knitted conducting tubes, including layered conducting tubes, include wire mesh gaskets from Kemtron Ltd. (http://www.kemtron.co.uk/mesh.html), knitted sleeves from Nokta Meta Ltd. (http://www.noktametal.com/stainless_fabric.htm), or knitted meshes from Golden Knitted Wire Mesh Factor (http://www.knittedwiremesh.com/). It is contemplated that these or other similar products can be adapted for use as conductors within the contemplated inventive electric deterrent device.

Preferred conductors are manufactured from robust conducting metals capable of withstanding outdoor extremes. Example suitable conducting metals include stainless steel (e.g., 316L), or other conducting materials that are resistant to corrosion and are suitable for outdoor use. One acceptable conducting material includes Monel®, which has better electrical conductivity than many stainless steels. Currently the a preferred conductor for use in an outdoor bird deterrent device includes corrosion resistant copper, ETP 0.005 inch diameter, tin-plated knitted wire mesh stocking One should appreciate a knitted conductor is neither a warp and weft mesh nor a braid as used in known art. Other non-warp and weft and non-braided woven conducting strands can include knotted strands, macramé strands, woolen conducting strands, or crocheted conducting strands. Such approaches can individually provide desired textured surfaces or can be combined to form textured contact surfaces. For example, one could use macramé to form woolen conducting strands into an elongated textured conductor having raised protrusions resulting from the macramé knots.

Early experiments using knitted conductors for a deterrent device have yielded potentially unexpected results relative to traditional conductors. First, a deterrent device using knitted conductors can flex without having multiple strands rub laterally against each other as occurs with multi-stranded woven or braided conductors, which could cause the strands to fatigue and break. Woven conductors tend to change their width as a deterrent device flexes, which can place undue stress on the base of the device or the fasteners holding the conductors to the base. A knitted conductor appears to allow the interlocking loops to slide into and out each other easily, which reduces wear and also provides for greater flexibility as a device is installed around sharp corners while the conductor retains its desired width. Second, the conductivity of the knitted conductors appears to be greater than that of a warp and weft mesh and that of a braided conductor. Having greater conductivity allows a deterrent device to be longer for a given amount of power supplied by a power source, which reduces costs to a consumer.

Knitted, macramé, or crocheted conductors also can utilize a thicker gauge wire than would ordinarily be used in a multi-strand braided or woven conductor, which is thought to increase the conductivity of the conductor. Additionally, the porous nature of a knitted conductor also ensures that the conductor can dry quickly when subjected to wet weather, as opposed to flat braids that can trap water. It should be appreciated that other advantages also exist including that each loop in the conductor acts like a spring which provides for resiliency under compression or extension, and that the conductor resumes its original shape if distorted within its yielding point.

Thus, specific compositions and methods of the inventive subject matter have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. An electrical deterrent device, comprising:
   an elongated base;
   a first conductor attached to the elongated base and comprising a conducting strand knitted with at least itself to form an elongated conducting band having added flexibility and a textured surface that provides many protruding contact points; and
   a power connector coupled to the first conductor and capable of connecting the first conductor to an electrical power source.

2. The device of claim 1, wherein the elongated conducting band comprises a knitted sheet.

3. The device of claim 1, wherein the elongated conducting band comprises a knitted ribbon.

4. The device of claim 1, wherein the elongated conducting band comprises a knitted wire mesh.

5. The device of claim 1, wherein the first conductor is mechanically attached to the elongated base.

6. The device of claim 1, wherein the first conductor is sewn to the elongated base.

7. The device of claim 1, wherein the first conductor is attached to the elongated base via a friction-fit.

8. The device of claim 1, wherein the first conductor is thermally attached to the elongated base.

9. The device of claim 1, further comprising a second conductor attached to the elongated base parallel to the first conductor, and also coupled to the power source.

10. The device of claim 9, wherein the elongated base further comprises an insulator disposed between the first conductor and the second conductor.

11. The device of claim 10, wherein the insulator comprises a raised portion of the elongated base.

12. The device of claim 1, wherein the elongated base further comprises at least one channel on a bottom of the elongated base.

13. The device of claim 1, further comprising an anti-arc lip.

14. The device of claim 1, wherein the elongated base further comprises an extruded hole.

15. An electrical deterrent device, comprising:
   an elongated base;
   first and second conductors disposed along, and attached to, the elongated base;
   wherein the first conductor comprises a first conducting strand knitted with at least itself to form a first elongated conducting band having a textured surface; and
   wherein the second conductor comprises a second conducting strand knitted with at least itself to form a second elongated conducting band having a textured surface;
   wherein said knitted conducting bands provide added flexibility and said textured surfaces provide a plurality of contact points.

16. The device of claim 15, wherein the first elongated conducting band comprises a knitted sheet.

17. The device of claim 15, wherein the first elongated conducting band comprises a knitted ribbon.

18. The device of claim 15, wherein the first elongated conducting band comprises a knitted wire mesh.

19. The device of claim 15, wherein the first elongated conducting band comprises a knitted tube.

20. The device of claim 15, wherein the first conductor comprises a third conducting strand knitted with itself and with the first conducting strand.

21. The device of claim 20, wherein the first and third conducting strands of the first conductor are layered to form the first conductor.

22. The device of claim 20, wherein the first and second conducting bands comprise nested knitted tubes.

* * * * *